(12) United States Patent
Neu et al.

(10) Patent No.: US 9,248,394 B2
(45) Date of Patent: Feb. 2, 2016

(54) AIR SCOOP-CYCLONE FILTER ASSEMBLY

(75) Inventors: Dagmar Neu, Bermatingen (DE);
Ingmar Berger, Stuttgart (DE); Patrick Spengler, Friedrichshafen (DE); Timo Stache, Friedrichshafen (DE); Dirk Pfuderer, Meersburg (DE)

(73) Assignee: MTU FRIEDRICHSHAFEN GMBH, Friedrichshafen (DE)

( * ) Notice: Subject to any disclaimer, the term of this patent is extended or adjusted under 35 U.S.C. 154(b) by 156 days.

(21) Appl. No.: 14/238,890

(22) PCT Filed: Aug. 8, 2012

(86) PCT No.: PCT/EP2012/003380
§ 371 (c)(1),
(2), (4) Date: Mar. 31, 2014

(87) PCT Pub. No.: WO2013/023759
PCT Pub. Date: Feb. 21, 2013

(65) Prior Publication Data
US 2014/0208701 A1    Jul. 31, 2014

(30) Foreign Application Priority Data

Aug. 16, 2011 (DE) .......................... 10 2011 110 696

(51) Int. Cl.
*B01D 50/00* (2006.01)
*B01D 45/16* (2006.01)
(Continued)

(52) U.S. Cl.
CPC .............. *B01D 50/002* (2013.01); *B01D 45/08* (2013.01); *B01D 45/12* (2013.01); *B01D 45/16* (2013.01); *F02M 35/0223* (2013.01); *F02M 35/084* (2013.01); *Y02T 10/146* (2013.01)

(58) Field of Classification Search
CPC .... Y02T 10/146; F02M 35/02; F02M 35/022; F02M 35/10013; F02M 35/084; F02M 35/0223; B01D 45/12; B01D 45/08; B01D 50/002; B01D 45/16; F01M 2013/0433
USPC ............... 55/318–325, 434, 462, 465; 95/268
See application file for complete search history.

(56) References Cited

U.S. PATENT DOCUMENTS

| 3,757,751 A | 9/1973 | Kitchin et al. |
| 4,159,899 A | 7/1979 | Deschenes |

(Continued)

FOREIGN PATENT DOCUMENTS

| DE | 2738293 A | 3/1979 |
| DE | 2837036 A | 3/1979 |

(Continued)

*Primary Examiner* — Dung H Bui
(74) *Attorney, Agent, or Firm* — Lucas & Mercanti, LLP; Klaus P. Stoffel

(57) ABSTRACT

An air scoop-cyclone filter assembly having an air scoop for guiding untreated air, which including an inlet opening, a deflection area for deflecting untreated air and an outlet opening, and having a cyclone filter for cleaning untreated air, which is connected downstream of the air scoop in the flow direction and is connected in an airtight manner to the air scoop A perforated plate is arranged in the cyclone filter as a filter inlet opening. The perforated plate has a first passage area having a high number of holes, a second passage area having a low number of holes at the geodetically deepest point, and a baffle plate. The baffle plate distributes the untreated air flow through the first and second passage area and, with the outer wall of the air scoop, forms a collecting chamber that stabilizes the flow.

4 Claims, 3 Drawing Sheets

(51) Int. Cl.
*B01D 45/08* (2006.01)
*B01D 45/12* (2006.01)
*F02M 35/022* (2006.01)
*F02M 35/08* (2006.01)

(56) References Cited

U.S. PATENT DOCUMENTS 4,204,848 A   5/1980   Schulmeister et al.
6,681,726 B2  1/2004   Linsbauer et al.
7,637,978 B2  12/2009  Jung
8,241,378 B2  8/2012   Sullivan et al.
2009/0020011 A1*  1/2009  Gregg ................ B01D 46/0043
                                                        95/268

FOREIGN PATENT DOCUMENTS

DE      10128790 A    12/2002
DE      102008017315 A  6/2009
EP      2055923 A     5/2009
WO      03084641 A    10/2003

* cited by examiner

PRIOR ART

AIR SCOOP-CYCLONE FILTER ASSEMBLY

The present application is a 371 of International application PCT/EP2012/003380, filed Aug. 8, 2012, which claims priority of DE 10 2011 110 696.4, filed Aug. 16, 2011, the priority of these applications is hereby claimed and these applications are incorporated herein by reference.

BACKGROUND OF THE INVENTION

The invention pertains to an air scoop-cyclone filter assembly with an air scoop for guiding untreated air, comprising an intake opening, a deflection area for deflecting the untreated air, and an exhaust opening; and with a cyclone filter for cleaning the untreated air, which is installed downstream from the air scoop and is connected to the air scoop in an air-tight manner, wherein a perforated plate is arranged in the cyclone filter to server as a filter intake opening.

DE 27 38 293 A1 of the applicant discloses an air filter device for a turbocharged internal combustion engine. A cyclone filter to clean the untreated air, the compressor of an exhaust gas turbocharger, a charging air cooler, and a dry air filter are arranged in the path taken by the air. The dust deposited in the cyclone filter is discharged from the cyclone filter by an exhaust gas blower.

The applicant is engaged in the series production of an air scoop-cyclone filter assembly with an L-shaped air scoop for guiding the untreated air and with a cyclone filter for cleaning the untreated air, the filter being installed downstream from the air scoop and connected to the air scoop in an air-tight manner. The air scoop-cyclone filter assembly is arranged in the path of the air as described in DE 27 38 293 A1. The air scoop has an intake opening, a deflecting area for deflecting the untreated air, and an outlet opening. The cyclone filter has a perforated plate as a filter intake opening, a first outlet opening for the charging air, and a second outlet opening, through which the dust is discharged. The perforated plate itself has a first pass-through area in the center with a large number of holes and an impassable edge area. A cyclone vent pipe is arranged in each hole of the perforated plate.

It has been found in practice that an increased amount of residual dust is found in the charging air of vehicles equipped with this air scoop-cyclone filter assembly when these vehicles are driven under congested, bumper-to-bumper conditions in a dusty environment or when driven in a desert. A large amount of residual dust in the charging air damages the impeller of the compressor of the exhaust gas turbocharger. The large amount of residual dust is attributable to the larger dust particles in the untreated air. These tend to settle at the geodesically lowest point of the air scoop-cyclone filter assembly. Because of the way in which the untreated air is deflected in the air scoop, however, an air vortex develops precisely in this area; this vortex picks up the larger dust particles and feeds them discontinuously back into the air stream.

SUMMARY OF THE INVENTION

The invention is therefore based on the goal of developing an improved air scoop-cyclone filter assembly.

This goal is achieved by an air scoop-cyclone filter assembly with the features of claim 1. Embodiments are described in the subclaims.

In the air scoop-cyclone filter assembly, the improvement is achieved in that the perforated plate comprises a first pass-through area with a large number of holes, a second pass-through area with a smaller number of holes at the geodesically lowest point, and a baffle plate. The baffle plate separates the first pass-through area from the second pass-through area. In addition, the baffle plate has a two-fold function. Its first function is to divide the untreated air stream into a first untreated air stream, which passes through the first area, and a second untreated air stream, which passes through the second area. According to its second function, the baffle plate cooperates with the outside wall of the air scoop to form a nonturbulent collecting space for the larger dust particles. The baffle plate therefore prevents the larger dust particles from being taken up by the first untreated air stream. The dust particles are then discharged from the collecting space through the second pass-through area. To reduce vortex formation, a curved supplemental guide plate is also provided in the air scoop, which improves the sedimentation of the larger dust particles from the untreated air.

As a result of the improved air scoop-cyclone filter assembly, the purity of the charging air which is supplied to the compressor of the exhaust gas turbocharger becomes even higher. Even under negative environmental conditions, therefore, it is possible to guarantee an appropriate service life; in the present case, this means that the intended service life of the compressor of the exhaust gas turbocharger can be guaranteed. The inventive air scoop-cyclone filter assembly is neutral with respect to the amount of space it occupies and therefore represents a solution which can easily replace an assembly previously installed in the vehicle.

A preferred exemplary embodiment is illustrated in the figures:

DETAILED DESCRIPTION OF THE INVENTION

Figure 1:
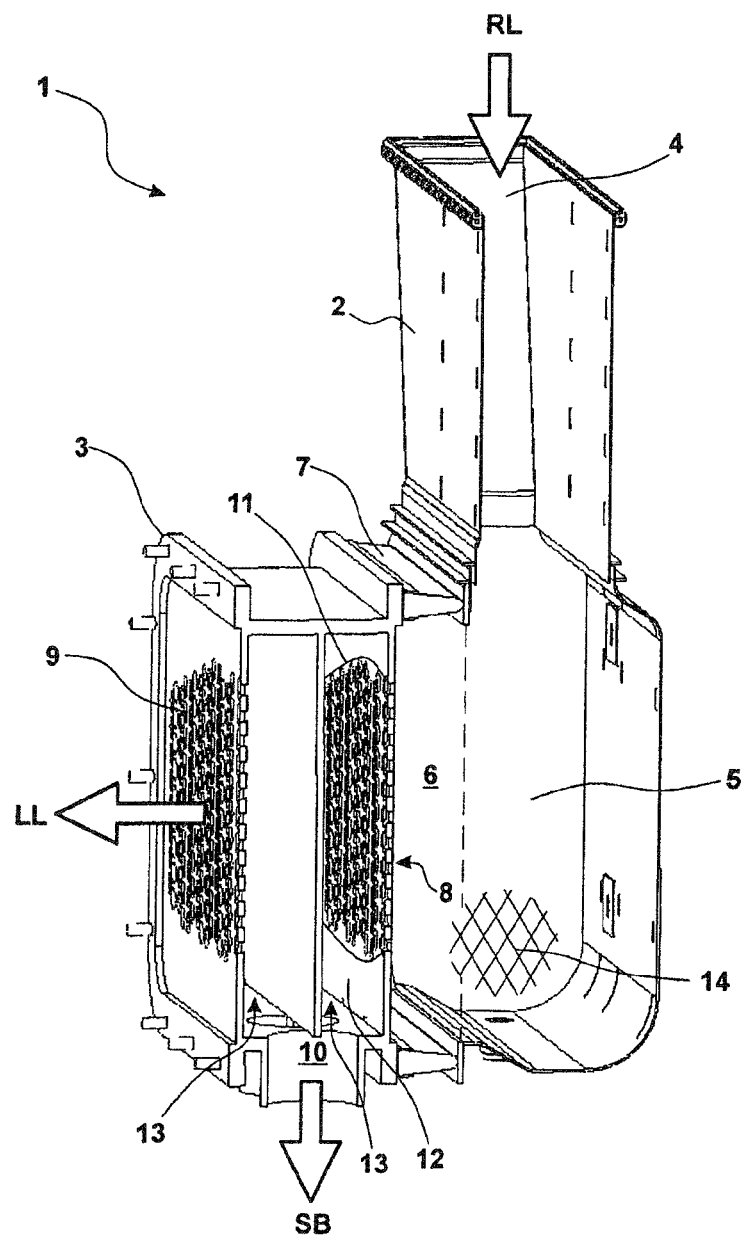
FIG. 1 shows an air scoop-cyclone filter assembly according to the prior art.

FIG. 1 shows a cross-sectional diagram of an air scoop-cyclone filter assembly 1 according to the prior art as mass-produced by the applicant. The assembly comprises an air scoop 2 for conducting the untreated air and a cyclone filter 3 for cleaning the untreated air. The air flows are indicated in the figure by arrows. The air scoop 2 is L-shaped and has an intake opening 4 for the untreated air RL, a deflecting area 5 for deflecting the untreated air, and an outlet opening 6. The air scoop 2 is followed in the direction of flow by the cyclone filter 3. The two components are connected to each other in an air-tight manner. This can be done, for example, by screwing the air scoop 2 to the cyclone filter 3 or, as shown, by connecting the two components by way of gasket 7. The cyclone filter 3 shown in FIG. 1 has a two-stage design and comprises a perforated plate 8 as the filter intake opening, a first outlet opening 9 for the charging air LL, and a second outlet opening 10 for the dust SB. In each opening of the perforated plate 8, a cyclone vent pipe is arranged, but these are not shown for reasons of clarity. The charging air LL is conveyed from the filter by the compressor of an exhaust gas turbocharger. Via the second outlet opening 10, the dust particles are discharged from an exhaust gas space 13 by a blower (not shown). The perforated plate 8 has a first pass-through area 11 in the center with a large number of holes and an impassable edge area 12. The larger dust particles of the untreated air RL settle at the geodesically lowest point of the air scoop-cyclone filter assembly. Because of the way in which the untreated air RL is deflected, however, an air vortex forms in the area 14; this vortex carries the larger dust particles upward and feeds them discontinuously back into the main flow. This discontinuous dust load has the effect of increasing the residual dust content in the charging air, which damages the impeller of the compressor of the exhaust gas turbocharger.

Figure 2:
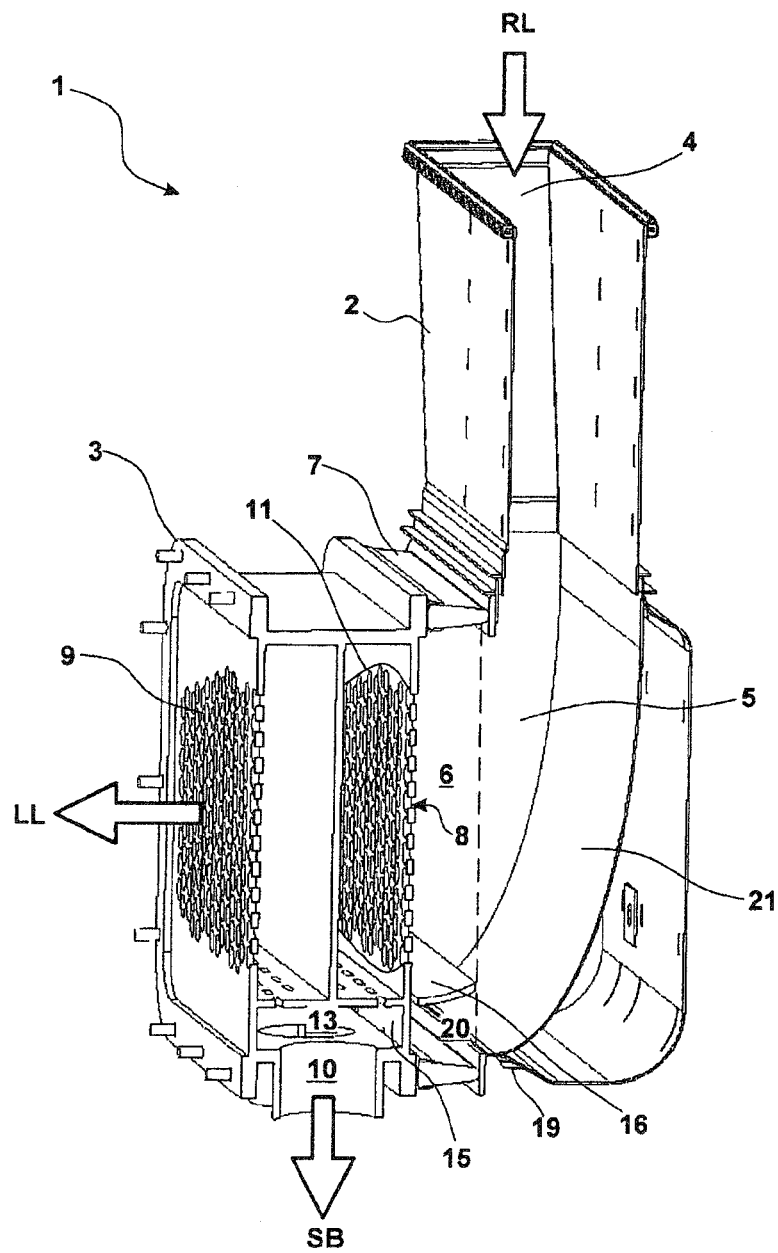
FIG. 2 shows an improved air scoop-cyclone filter assembly.
Figure 3:
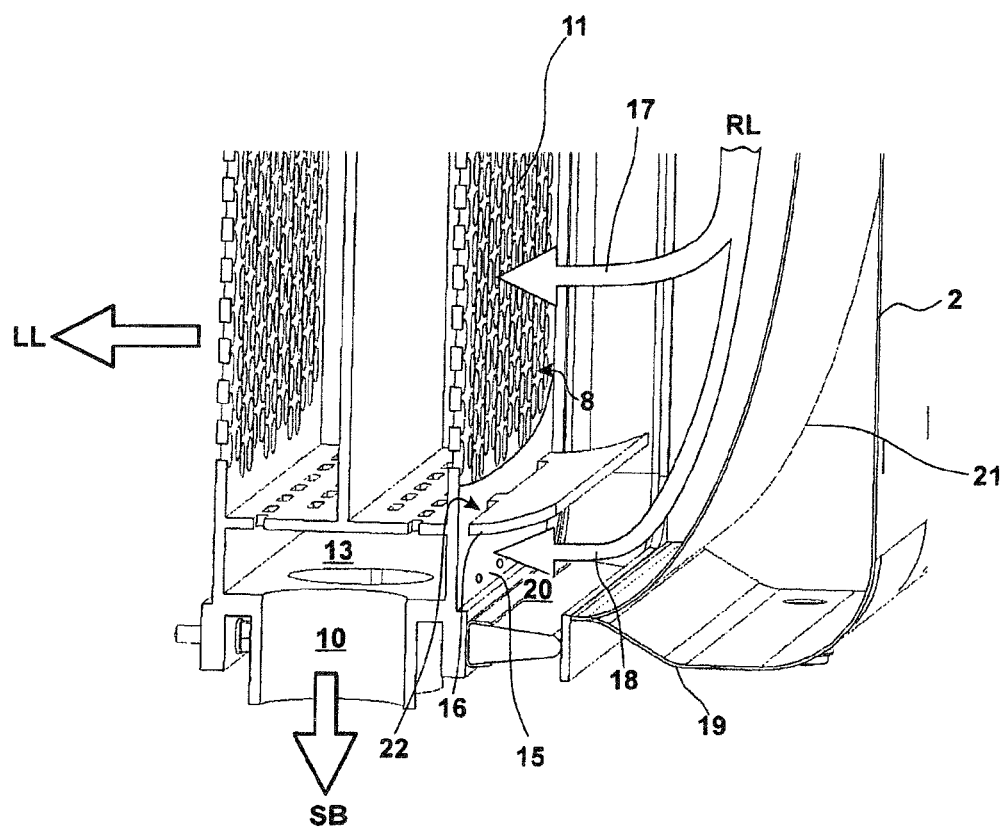
FIG. 3 shows a partial area of FIG. 2.

FIG. 2 shows a cross-sectional diagram of an improved air scoop-cyclone filter assembly 1. Components which are the same as those of FIG. 1 are designated by the same reference numbers. The description below also applies equally to FIG. 3, which shows a partial area of FIG. 2, namely, the area where the perforated plate 8 is located. The perforated plate 8 of the cyclone filter 3 shows the first pass-through area 11 in the center, but now it also has a second pass-through area 15 with a smaller number of holes at the geodesically lowest point. See also FIG. 3. The perforated plate 8 is also provided with a supplemental baffle plate 16, which separates the first pass-through area 11 from the second pass-through area 15 and projects into the outlet opening 6 of the air scoop 2. The baffle plate 16 fulfills a two-fold function here. First, it divides the flow of untreated air RL into a first untreated air stream 17, which passes through the first area 11, and a second untreated air stream 18, which passes through the second area 15. According to its second function, the baffle plate 16 cooperates with the outside wall 19 of the air scoop 2 and possibly with the gasket 7 to form a nonturbulent collecting space 20. The larger dust particles collect in this collecting space 20. The baffle plate 16 prevents the larger dust particles from being carried into the first untreated air stream 17. As an option, the baffle plate 16 could also have slots 22. The larger dust particles still present in the first untreated air stream 17 will then be carried away into the collecting space through the slots 22. From the collecting space 20, the dust particles are discharged through the second pass-through area 15 into the exhaust space 13 and then discharged through the second outlet opening 10 by a dust blower. As an additional measure for preventing the formation of vortices, a curved guide plate 21 is provided in the air scoop 2, which improves the sedimentation of the larger dust particles from the untreated air RL.

LIST OF REFERENCE NUMBERS

1 air scoop-cyclone filter assembly
2 air scoop
3 cyclone filter
4 inlet opening
5 deflecting area
6 outlet opening
7 gasket
8 perforated plate
9 first outlet opening
10 second outlet opening
11 first pass-through area
12 edge area
13 exhaust space
14 vortex area
15 second pass-through area
16 baffle plate
17 first untreated air stream
18 second untreated air stream
19 outside wall
20 collecting space
21 guide plate

The invention claimed is:

1. An air scoop-cyclone filter assembly comprising: an air scoop for guiding untreated air, the scoop comprises an inlet opening, a deflecting area for deflecting the untreated air, and an outlet opening; and a cyclone filter for cleaning the untreated air, the cyclone filter being installed downstream from the air scoop and connected to the air scoop in an airtight manner, wherein a perforated plate is arranged in the cyclone filter to serve as a filter inlet opening, the perforated plate comprising a first pass-through area with a large number of holes, a second pass-through area with a smaller number of holes at a geodesically lowest point, and a baffle plate, wherein the baffle plate divides the untreated air stream between the first pass-through area and the second pass-through area and cooperates with an outside wall of the air scoop to form a nonturbulent collecting space.

2. The air scoop-cyclone filter assembly according to claim 1, wherein the cyclone filter comprises a first outlet opening for charging air and a second outlet opening for dust discharge, and, with respect to a flow of air, the collecting space is connected to the second outlet opening via the second pass-through area.

3. The air scoop-cyclone filter assembly according to claim 2, wherein a guide plate for guiding the untreated air is arranged in the deflecting area of the air scoop.

4. The air scoop-cyclone filter assembly according to claim 2, wherein the cyclone filter has a two-stage design.

* * * * *